(12) United States Patent
Lyngbäck et al.

(10) Patent No.: US 11,235,692 B2
(45) Date of Patent: Feb. 1, 2022

(54) WORKING UNIT, A WORKING EQUIPMENT, AND A METHOD IN RELATION TO A WORKING UNIT

(71) Applicant: Hiab AB, Kista (SE)

(72) Inventors: Hans Lyngbäck, Hudiksvall (SE); Per Gustafsson, Hudiksvall (SE)

(73) Assignee: Hiab AB, Kista (SE)

( * ) Notice: Subject to any disclaimer, the term of this patent is extended or adjusted under 35 U.S.C. 154(b) by 21 days.

(21) Appl. No.: 16/910,569

(22) Filed: Jun. 24, 2020

(65) Prior Publication Data

US 2020/0398729 A1 Dec. 24, 2020

(30) Foreign Application Priority Data

Jun. 24, 2019 (EP) ...................................... 19181891

(51) Int. Cl.
*B60P 1/64* (2006.01)
*G06T 7/00* (2017.01)

(52) U.S. Cl.
CPC ........... *B60P 1/6409* (2013.01); *B60P 1/6427* (2013.01); *G06T 7/0004* (2013.01); *G06T 2207/30252* (2013.01)

(58) Field of Classification Search
CPC ..... B60P 1/6409; B60P 1/6427; B60P 1/6463; G05D 1/0246
USPC ........................................................ 414/538
See application file for complete search history.

(56) References Cited

U.S. PATENT DOCUMENTS 6,126,378 A * 10/2000 Landoll ................. B60P 1/6454
254/328

FOREIGN PATENT DOCUMENTS

| CN | 203331919 U | 12/2013 | |
|---|---|---|---|
| DE | 195 26 702 A1 | 2/1997 | |
| DE | 103 50 923 A1 | 5/2005 | |
| DE | 10 2006 057 610 A1 | 4/2008 | |
| DE | 202020103091 U1 * | 9/2020 | ............ B60P 1/6409 |
| EP | 3 153 348 A1 | 4/2017 | |
| EP | 3 495 202 A1 | 6/2019 | |
| WO | 2010/010977 A1 | 1/2010 | |
| WO | 2017/108764 A1 | 6/2017 | |
| WO | 2017/068934 A1 | 8/2018 | |

\* cited by examiner

*Primary Examiner* — James Keenan
(74) *Attorney, Agent, or Firm* — Renner, Otto, Boisselle & Sklar, LLP

(57) ABSTRACT

A vehicle, equipment for loading a load carrying device onto the vehicle, and a sensor that determines a deviation angle between longitudinal axes of the vehicle and load carrying device. A control compares the deviation angle to a maximum deviation angle, and if less than maximum deviation angle a loading procedure is performed, which procedure includes engaging a loading tool with an attachment part at an end of the load carrying device; lifting the end by the loading tool while another end of the load carrying device is on the ground; adjusting the vehicle position to decrease the deviation angle while the working equipment lifts the end of the load carrying device; monitoring the deviation angle during adjustment, comparing the deviation angle to a threshold deviation angle, and moving the load carrying device onto the vehicle in response to the deviation angle being less than the threshold deviation angle.

16 Claims, 3 Drawing Sheets

WORKING UNIT, A WORKING EQUIPMENT, AND A METHOD IN RELATION TO A WORKING UNIT

This application claims priority to European Patent Application No. 19181891.3 filed on Jun. 24, 2019, which is hereby incorporated herein by reference.

TECHNICAL FIELD

The present disclosure relates to a working unit that comprises a vehicle and a working equipment, e.g. a hook-lift, a working equipment, and a method in relation to the working unit. More specifically, the disclosure relates to a loading procedure performed by the working unit, or by the working equipment, to load a load carrying device, e.g. a container, on to the vehicle by using the working equipment.

BACKGROUND

A vehicle may be equipped with different working equipment, such as a loader crane or a hook-lift (also called a demountable), to perform certain working tasks.

With a hook-lift mounted on a vehicle, such as a truck, the vehicle may load and unload load carrying devices like flatbeds, dumpster bodies, and similar containers. Various applications within waste-handling, recycling, scrap and demolition industries are then available.

As the working equipment is mounted on a movable vehicle, the position and direction of the working equipment relative the load carrying device is depending on the position and sometimes also the direction of the vehicle. In order to achieve a viable, or optimal workflow, for the working equipment the vehicle position relative to the device (and also the surrounding) often needs to be adjusted. Today this is managed by the driver of the vehicle, and it is the experience and knowledge of the driver that determines the success and safety of the work that is performed by the vehicle and working equipment. Other factors such as the time spent on a working task and the wear and tear of the working equipment is also affected by the driver's choices during a working assignment.

In the following some documents within the same technical field as the present disclosure will be presented and briefly discussed.

WO2010010977 describes a container handling system having sensors to detect angle deviations between hook and container and adapt the automatic loading/unloading procedure. This involves using e.g. ultrasonic sensors to detect vertical and horizontal angle deviations and adjust the position and angle of the hook.

WO2017108764 describes a method for providing guidance for the alignment of a moveable first coupling of a vehicle and a second coupling of a body such as a container. A camera is used to visually assist lateral and height alignment of vehicle and container.

Assistance information can be overlaid in a display and the procedure, including backing and lateral/height adjustment can be fully automatic.

WO2017068934 relates to a container-handling vehicle having a hook that can be engaged with a part of the container by controlling an actuator arm Imaging devices are provided on the arm, and rear/sides of the vehicle. A display on the inside of the cab in communication with the imaging devices is used during reverse driving. The document basically describes a backing drive assistance system for manually loading containers, using cameras and a display.

CN203331919 relates to a control system for aligning a self-loading and unloading transport vehicle (trailer) with containers. The system uses ultrasonic sensors for the alignment. Indicator lights are used to guide the driver.

DE102006057610 discloses a method for loading container on a vehicle in which the distance and height difference between the vehicle and container is detected with a sensor, such as a camera or radar. The height can be automatically adjusted according to the sensor readings. The document also discusses automatic control of the vehicle movements.

DE19526702 describes an automatic reverse steering method for engaging a vehicle trailer with a container. The method uses a camera and controls the steering based upon the angle between the trailer and container.

DE10350923 describes a method for automated reverse positioning a load vehicle in relation to a container for loading. The method uses a camera and calculates with the knowledge of container dimensions the optimal driving instructions.

The present disclosure is focused on how to enable autonomous mode, or assistance mode (a mode where the system generates driving instructions to aid the driver), handling of a load carrying device by a working unit, i.e. a vehicle and a working equipment, or by a working equipment, and in particular how to perform a loading procedure, i.e. to load a load carrying device, e.g. a container, on to a vehicle using a working equipment. For example; when loading a container on a truck using a hook-lift, the deviation angle between the longitudinal axes of the vehicle and the container must not exceed a predetermined angle threshold.

A more general object of the present invention is to achieve an improved working unit, working equipment, and method, where the improvement lies in that the safety of the work performed by the vehicle and working equipment is less dependent upon the experience and knowledge of the driver during a loading procedure.

SUMMARY

The above-mentioned objects are achieved by the present invention according to the independent claims.

Preferred embodiments are set forth in the dependent claims.

When loading a load carrying device, e.g. a container, on a vehicle with a working equipment, e.g. a hook-lift, the vehicle should in optimal cases be completely aligned with the container ensuring the rails of the container are aligned with the rollers of the hook-lift frame. However this is often not the case and assistance mode and autonomous working units, and working equipment, according to the present invention should be able to handle cases where the vehicle and container are not completely aligned.

A solution to this problem is presented herein according to the present invention describing a working unit comprising a vehicle and a working equipment, a working equipment, and a method, for loading a load carrying device on to the vehicle.

The invention is based on estimating the deviation angle between a longitudinal axis of the load carrying device and a longitudinal axis of the vehicle. This estimation is preferably performed on a set of image data depicting the load carrying device, or the vehicle, received from a sensor arrangement mounted on the working unit, and/or at the working equipment.

The deviation angle is first compared to a predetermined maximum deviation angle which gives input regarding if a loading may be successfully performed or not.

If the deviation angle is less than this predetermined maximum deviation angle the loading is initiated and a loading tool of the working equipment is then engaged with an attachment part at the front of the load carrying device.

The front end of the load carrying device is then lifted with the working equipment, and a set of operation instructions is generated to the vehicle for adjusting the position of the vehicle to decrease the deviation angle while the working equipment lifts a part of the load carrying device and another part of the load carrying device is still on the ground. By lifting a part of the load carrying device while moving the vehicle, the vehicle is offered more space to correct the deviation angle in relation to the load carrying device, i.e. making the adjustment of the vehicle faster and more space efficient compared to when the vehicle has to drive forward and away from the load carrying device first in order to create enough distance to the load carrying device for the adjustment of the alignment.

The deviation angle is monitored during the adjustment of the vehicle position and further compared to a predetermined loading threshold deviation angle. The predetermined loading threshold deviation angle denotes the maximum deviation angle for when the load carrying device may be successfully pulled up to the rollers. A set of operation instructions for the working equipment to move the load carrying device on to the vehicle is generated in response to the deviation angle being smaller than the loading threshold deviation angle.

The loading procedure according to the present invention offers several advantages, including that the vehicle will be less sensitive to the relative positions of the load carrying device to be loaded and the vehicle—as the relative positions will be controlled and optimized, and that the safety of the system will be increased as more cases may be handled in a controlled manner and adjusted for accordingly.

DETAILED DESCRIPTION

The working unit, the working equipment, and the method in relation to the working unit, will now be described in detail with references to the appended figures. Throughout the figures the same, or similar, items have the same reference signs. Moreover, the items and the figures are not necessarily to scale, emphasis instead being placed upon illustrating the principles of the invention.

The basis for the present invention is a system approach to the vehicle and working equipment (together forming a working unit).

The control system of the vehicle and the working equipment are connected using a machine to machine (M2M) connection, such as CAN. More, particularly and with references to FIGS. 1A and 1B, the control system 12 is provided with a communication interface and is connected to a common data bus 11, e.g. a CAN bus, and is configured to perform bidirectional communication, e.g. comprising sensor signals, to other units, e.g. to a sensor arrangement 8. This bidirectional communication is indicated by double-directed block-arrows in FIGS. 1A and 1B.

Figure 1A:
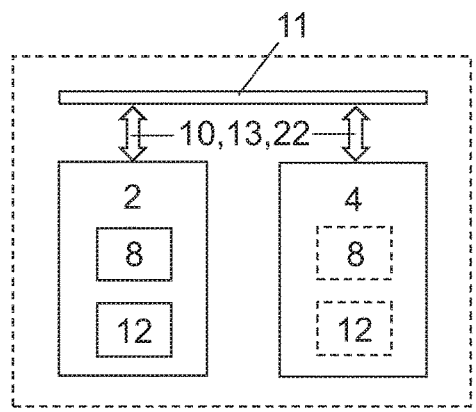
FIG. 1A is a block diagram schematically illustrating the working unit according to the present invention.

In FIG. 1A the working unit comprising the vehicle 2 and the working equipment 4 is illustrated. The vehicle comprises at least one control system 12 and the sensor arrangement 8. The working equipment may also comprise at least one control system 12, and also a sensor arrangement 8.

Figure 1B:
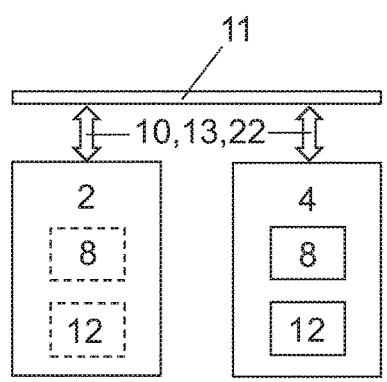
FIG. 1B is a block diagram schematically illustrating the working equipment according to the present invention.

In FIG. 1B the working equipment 4 is illustrated which is configured to work in relation to a vehicle 2. The working equipment comprises at least one control system 12, and also a sensor arrangement 8. Additional control system(s) 12, and also a sensor arrangement 8 may be provided at the vehicle. The control system 12 of the working equipment 8 is configured to issue operating instructions for the vehicle as well as the working equipment (and the other way around).

Measurements from sensors detecting moving and non-moving objects and/or the corresponding positions of the objects relative to the vehicle and/or working equipment (both the distance to and orientation of the detected objects relative to the vehicle and/or working equipment are of interest) are important for the system. The moving and non-moving object may include a load carrying device, e.g. a container, to be loaded on to the vehicle, in the environment of the vehicle. Examples of such sensors are LIDAR, 3D Cam, Cameras, Lasers, thermal cameras, and radar. The measurements and signals from these sensor may be used in combination to achieve reliable object detection and distance estimation. Common for these type of sensors is that they image or describe the surroundings with image data. Image data in this aspect being data organized in a matrix to describe the spatial relationship of the surrounding with respect to what the sensors are measuring. The sensors may be mounted to the vehicle and/or the working unit and are connected to the control systems of the vehicle and/or the working equipment.

When loading an object on a working unit, comprising a vehicle and a working equipment, image data is first captured. The image data is typically describing an area partly surrounding the working unit and is e.g. captured with a sensor member mounted on the working unit. The definition of image data is broad, and covering visual images, video data, thermal images, LIDAR and radar data etc. Spatial features of objects in the area are extracted by analyzing the captured set of image data and objects for loading can hence be detected. For example, the system can be set up to detect recycling bins or various types of containers, flatbeds or other types of compartments or receptacles for carrying or containing load during transport. Driving instructions may be generated to drive the vehicle to a position where it is in the proximity of the load carrying device based upon sensor data and/or GPS coordinates.

Figure 2:
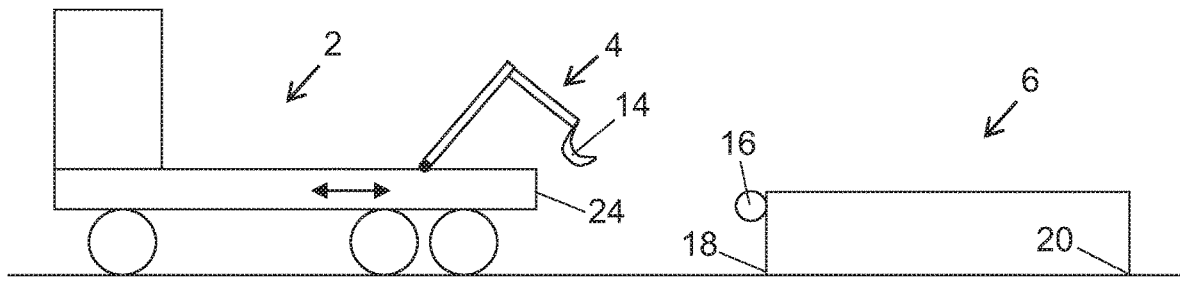
FIGS. 2-4 are side views schematically illustrating a working unit, and a working equipment, according to the present invention during a loading procedure.
Figure 3:
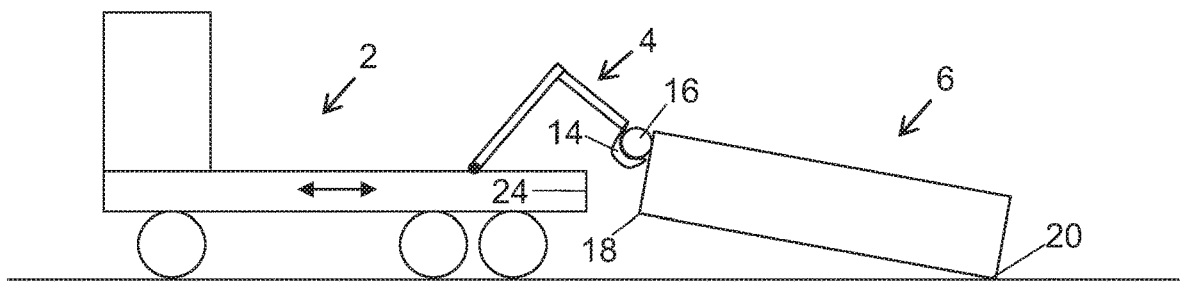
Figure 4:
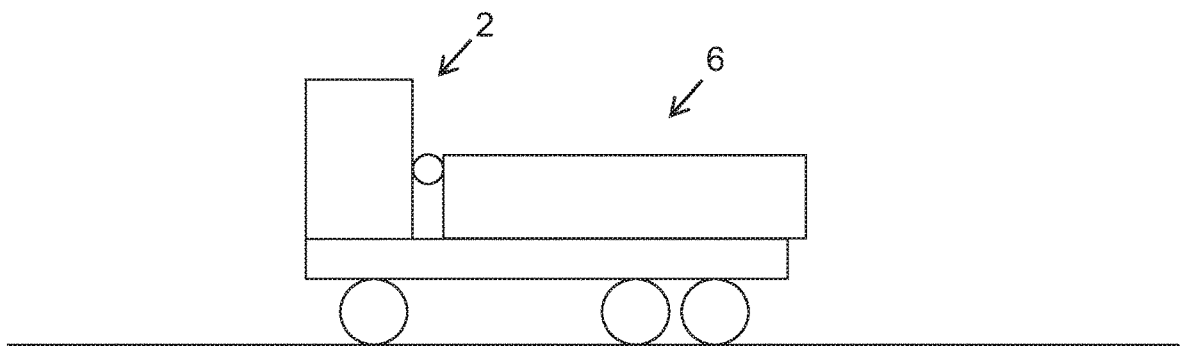
Figure 5:
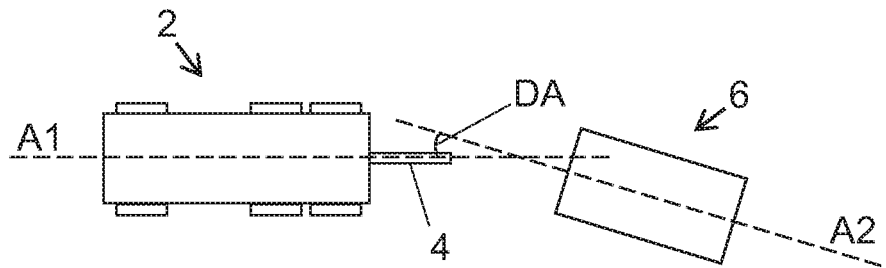
FIGS. 5-7 are views from above schematically illustrating a working unit, and a working equipment, according to the present invention during a loading procedure.

With references to the block diagram shown in FIG. 1A, the schematic side views shown in FIGS. 2-4, and to the schematic overview illustrations shown in FIGS. 5-7, the working unit according to the present invention will now be described in detail.

The working unit, indicated by a dashed rectangle in FIG. 1A, comprises a vehicle 2 and a working equipment 4 configured to load a load carrying device 6 on to the vehicle 2. Load carrying device is e.g. a container or other similar objects like flatbeds or other types of compartments or receptacles for carrying or containing load during transport.

The working unit comprises a sensor arrangement 8 (see FIG. 1A) comprising at least one sensor member arranged at the working unit. The sensor member may be one or many of the sensors mentioned above. The at least one sensor member is configured to determine an angle, denoted deviation angle DA, between a longitudinal axis A1 of the vehicle and a longitudinal axis A2 of the load carrying device 6, and to generate an angle deviation signal 10 in dependence thereto. The working unit also comprises a control system 12 (see FIG. 1A) configured to receive the angle deviation signal 10.

The DA may be determined in many different ways, e.g. by analysing the captured set of image data of predetermined parts of the vehicle and the load carrying device, by identifying distances to predetermined points on the load carrying device, or by identifying predetermined structures, e.g. longitudinal rails, on the load carrying device.

The control system 12 is provided with a communication interface and is connected to a common data bus 11, e.g. a CAN bus, and is configured to perform bidirectional communication, e.g. comprising sensor signals, to other units. This bidirectional communication is indicated by double-directed block-arrows in FIG. 1A. Also the sensor arrangement 8 is configured to perform the bidirectional communication via the common data bus. Further protocols based on CAN may be applied, like application layer protocols such as SAE J1939 for in-vehicle networks for buses and trucks may further be used for the communication. As an alternative various protocols based on Ethernet and similar standards may be used such as Broad R Reach, or GMSL. Within a system with working units mounted on a vehicle various communication protocols may be used in different parts of the system.

The control system 12 is configured to determine control signals 13 for controlling various devices and means required to operate the vehicle and working equipment, and the control system disclosed herein comprises the necessary processing capacity to perform its intended task and comprises necessary data storage capabilities, and communication capabilities to support the task. The control system may be decentralized, i.e. divided into several sub-control units distributed on both the vehicle 2 and the working equipment 4, and is provided with one or many memory units. It is also provided with communication capabilities, both via physical connections and/or wireless connections.

The control system is configured to compare the DA to a predetermined maximum deviation angle DAMAX, and if the DA is less than the DAMAX the vehicle is set in a loading mode comprising applying a loading procedure. DAMAX is preferably in the range of 10-45 degrees.

The loading procedure comprises initially engaging a loading tool 14, preferably a hook of a hook-lift, of the working equipment 4 with an attachment part 16 at a first end 18 of the load carrying device 6. The attachment part 16 has a construction and shape facilitating attachment of the loading tool. If the loading tool is a hook, the attachment part may be a rod permanently attached to the load carrying device.

Thereafter, the loading procedure continues by lifting the first end 18 of the load carrying device 6 by the loading tool 14 while a second end 20 of the load carrying device 6 is on ground. This is illustrated in FIG. 3.

The loading procedure continues by generating a first set of operation instructions to the vehicle for adjusting the position of the vehicle 2 to decrease the DA while the working equipment 4 lifts the first end 18 of the load carrying device 6; and monitoring the DA during the adjustment of the vehicle position, and comparing the DA to a predetermined loading threshold deviation angle DALT, being smaller than the DAMAX.

Provided that the DA being smaller than the DALT, the loading procedure continues by generating a second set of operation instructions for the working equipment 4 to move the load carrying device 6 on to the vehicle 2. FIG. 4 illustrates the final stage, i.e. when the load carrying device has been moved on to the vehicle.

Figure 6:
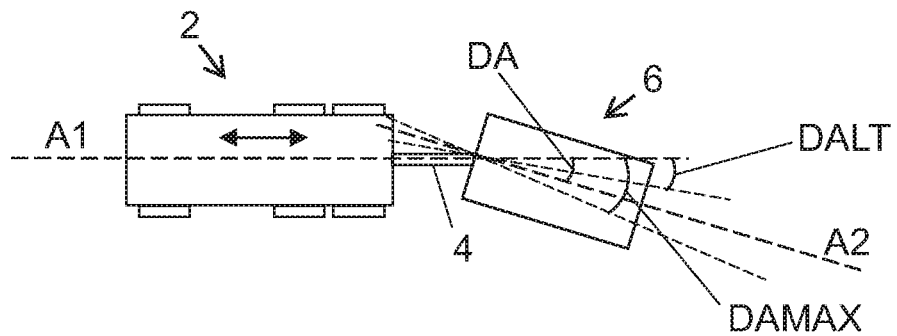

In the schematic view from above shown in FIG. 6 is illustrated one exemplary situation where the DA is larger than DALT, but smaller than DAMAX. In the illustrated example the DA is too large to allow the load carrying device to be moved onto the vehicle.

Figure 7:
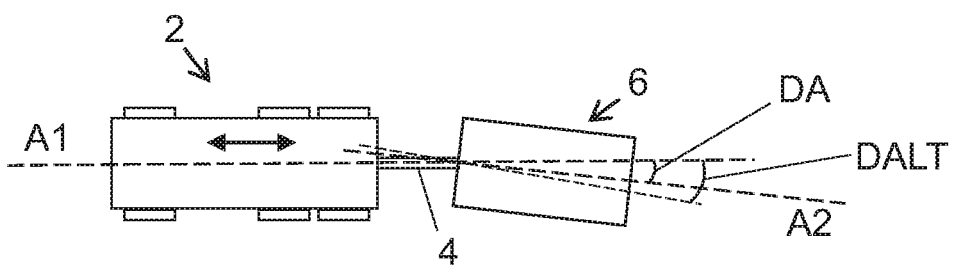

In the schematic view from above shown in FIG. 7 DA is smaller than DALT, and the loading procedure may continue and operation instructions are generated to move the load carrying device on to the vehicle.

According to one embodiment the at least one sensor member is also configured to measure a proximity parameter related to the distance between the vehicle 2 and the load carrying device 6, and to generate a proximity signal 22 when the first end 18 of the load carrying device 6 is within a proximity range of a first end 24 of the vehicle 2, and that the control system 12 is configured to receive the proximity signal 22. Receipt of the proximity signal is a presumption for the control system to set the vehicle 2 in the loading mode, i.e. to change mode from a normal operation mode to the loading mode. The proximity range is preferably within an interval of some meters, e.g. 2-10 meters. FIG. 2 shows an exemplary illustration of when the first end 24 of the vehicle is within the proximity range. One situation where generating a proximity signal is when the vehicle is not aligned with the load carrying device to be loaded but the vehicle is too close to the load carrying device to make further adjustments to the position.

According to one embodiment the operation instructions of the first set of operation instructions are continuously updated during the loading procedure, and that the DA is continuously monitored during the loading procedure. The movement of the vehicle may then be controlled in real time in dependence of the measured deviation angle DA, which is advantageous in order to obtain an accurate control of the various steps performed during a loading procedure.

In a further embodiment the loading procedure is stopped if DA is equal or larger than DAMAX when the loading tool 14 is attached to the attachment part 16 of the load carrying device 6. In that situation an operator may interfere, or another procedure may be initiated, in order to move the vehicle such that DA again is smaller than DAMAX.

In another embodiment the operation instructions, i.e. the first and/or the second operation instructions, are guiding instructions to an operator of the working unit, which is the case if the vehicle or working equipment is operated according to an assistance mode, or the operation instructions may be control instructions of the control signals 13 directly applied to control the vehicle 2 or working equipment 4, which is the case if the vehicle or working equipment is operated according to an autonomous driving mode. The assistance mode and the autonomous mode may be combined such that the first operation instructions are generated in assistance mode and the second operation instructions are generated autonomously (or the other way around).

Preferably, the first set of operation instructions comprises steering instructions to the vehicle 2, and driving instructions to move the vehicle 2 forward or rearward. This is indicated by double-arrows in the figures. Driving the vehicle forward is the easiest way of adjusting the alignment. The load carrying device to be loaded would then be dragged a smaller distance, it would then be advantageous if the object to be loaded had wheels (or that the ground is covered with e.g. snow or ice).

In one embodiment, at least one of the sensor members is configured to determine a set of image data depicting the load carrying device 6, and that the control system 12 is configured to determine the DA based upon said image data. More particularly, at least one of the sensor members is configured to determine a set of image data depicting a front surface of the load carrying device 6, and that the control system 12 is configured to determine the DA based upon the angle between the front surface of the load carrying device 6 and a back surface of the vehicle 2 based upon the image data. The back surface of the vehicle defines a plane being in a known relationship to the longitudinal axis A1 of the vehicle. The relationship may be that the axis A1 is perpendicular to the defined plane. In the same way, the front surface of the load carrying device has a known relationship to the longitudinal axis A2, e.g. the axis A2 is perpendicular to the plane defined by the front surface of the load carrying device.

According to another embodiment, the monitoring of the DA is performed by detecting and analyzing the position of a set of rails arranged on the underside of the load carrying device 6 in a set of image data received from the sensor arrangement 8. The set of rails may have a direction that is parallel to the longitudinal axis A2 of the load carrying device.

Preferably, the loading tool 14 is a hook, and the working equipment 4 is a hook-lift. This embodiment is schematically illustrated in in FIGS. 2 and 3.

In a further variation of the present invention of the working unit, the working equipment 4 comprises the sensor arrangement 8 and the control system 12, and the control system arranged at the working equipment may then control the vehicle.

More particularly, the working equipment comprises a sensor arrangement 8 configured to capture environmental data reflecting the environment around the working equipment and vehicle when mounted on the vehicle, and to determine, based on said data, image data representing an area at least partly surrounding the working equipment and the vehicle 2. The sensor arrangement comprises one or many sensors which has been exemplified above in relation to the description of the vehicle. The one or many sensors may be mounted at the working equipment and/or at the vehicle.

Thus, in this embodiment, the working equipment comprises a control system 12 which is configured to perform the loading procedure in accordance with the above description. As an alternative, the control system 12 may be located on the vehicle or the working equipment or distributed on both the vehicle and working equipment. One advantage of having the control system 12, at least partly located as part of the working equipment is that the driving instructions would need to be adapted to the working equipment.

The present invention also relates to a working equipment 4 configured to load a load carrying device 6 on to a vehicle 2. The working equipment 4 will now be described with references to FIGS. 1B and 2-7, and it is also referred to the above description of the working unit where that description is applicable.

The working equipment 4 comprises a sensor arrangement 8 comprising at least one sensor member arranged at the working equipment. The at least one sensor member is configured to determine an angle, denoted deviation angle DA, between a longitudinal axis A1 of the vehicle and a longitudinal axis A2 of the load carrying device 6, and to generate an angle deviation signal 10 in dependence thereto. The working equipment also comprises a control system 12 configured to receive said angle deviation signal 10. The control system is configured to compare said DA to a predetermined maximum deviation angle DAMAX, and if said DA is less than said DAMAX the vehicle is set in a loading mode comprising applying a loading procedure, the loading procedure comprising:

engaging a loading tool 14 of the working equipment 4 with an attachment part 16 at a first end 18 of the load carrying device 6;

lifting the first end 18 of the load carrying device 6 by said loading tool 14 while a second end 20 of the load carrying device 6 is on ground;

generating a first set of operation instructions for adjusting the position of the vehicle 2 to decrease the DA while the working equipment 4 lifts said first end 18 of the load carrying device 6;

monitoring the DA during the adjustment of the vehicle position, and comparing the DA to a predetermined loading threshold deviation angle DALT, being less than said DAMAX, generating a second set of operation instructions for the working equipment 4 to move the load carrying device 6 on to the vehicle 2 in response to the DA being less than the DALT. Preferably, the loading tool 14 is a hook, and the working equipment 4 is a hook-lift.

According to one embodiment of the working equipment 4, the at least one of the sensor members is configured to determine a set of image data depicting a back surface of the vehicle 2, and that the control system 12 is configured to determine the DA based upon the angle between said back surface of the vehicle 2 and a front surface of the load carrying device 6 based upon the image data.

In a further embodiment the control system 12 is configured to control the vehicle 2 by the first set of operation instructions (which are included in the control signal 13), which is applied to the vehicle via a communication bus 11, e.g. a CAN.

Figure 8:
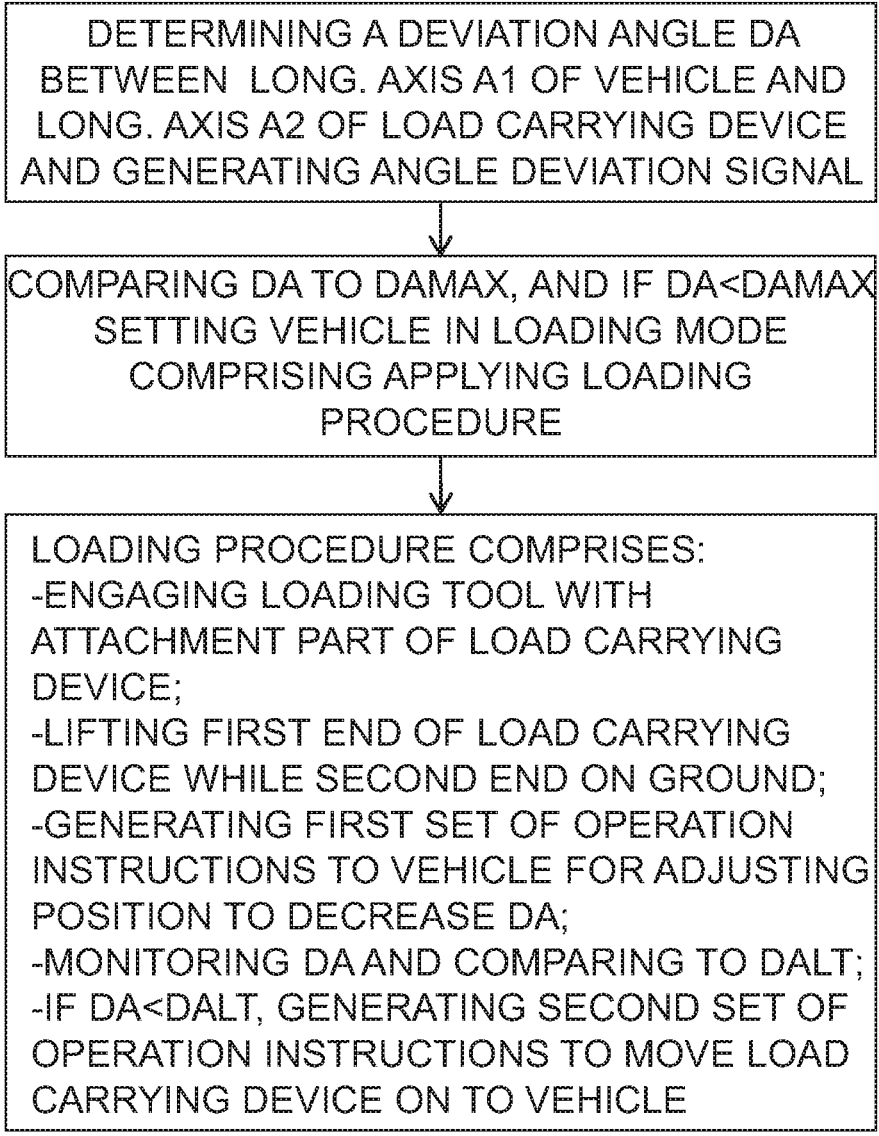
FIG. 8 is a flow diagram illustrating the method according to the present invention.

The present invention also relates to method in relation to a working unit that comprises a vehicle and a working equipment configured to load a load carrying device on to said vehicle. The working unit has been described in detail above, and it is herein referred to that description. The method is schematically illustrated in the flow diagram in FIG. 8.

The method comprises determining an angle, denoted deviation angle DA, between a longitudinal axis A1 of the vehicle and a longitudinal axis A2 of the load carrying device, and generating an angle deviation signal in dependence thereto.

The method further comprises:

comparing the DA to a predetermined maximum deviation angle DAMAX, and if the DA is smaller than the DAMAX the method comprises setting the vehicle in a loading mode comprising applying a loading procedure.

The loading procedure comprises:

engaging a loading tool of the working equipment with an attachment part at a first end of the load carrying device;

lifting the first end of the load carrying device by the loading tool while a second end of the load carrying device is on ground;

generating a first set of operation instructions to the vehicle for adjusting the position of the vehicle to decrease the DA while the working equipment lifts said first end of the load carrying device;

monitoring the deviation angle during the adjustment of the vehicle position and comparing the DA to a predetermined loading threshold deviation angle DALT, being smaller than the DAMAX, generating a second set of operation instructions for the working equipment to move the load carrying device on to the vehicle in response to the DA being smaller than the DALT.

In one embodiment the method comprises measuring, by the at least one sensor member, a proximity parameter related to the distance between the vehicle and the load carrying device, and generating a proximity signal when the first end of the load carrying device is within a proximity range of a first end of the vehicle, and receiving the proximity signal, by the control system, wherein receipt of said proximity signal is a presumption for setting the vehicle in the loading mode.

In a further embodiment the method also comprises determining a set of image data, by the at least one of the sensor members, depicting a front surface of the load carrying device, and determining the DA based upon the angle between the front surface of the load carrying device and a back surface of the vehicle based upon said image data.

In one other embodiment the method comprises that the monitoring of the DA is performed by detecting and analyzing the position of a set of rails arranged on the underside of the load carrying device in a set of image data received from said sensor arrangement.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A working unit comprising a vehicle and a working equipment configured to load a load carrying device onto said vehicle, said working unit further comprising:

a sensor arrangement comprising at least one sensor member arranged at said working unit, said at least one sensor member being configured to determine a deviation angle between a longitudinal axis of said vehicle and a longitudinal axis of said load carrying device, and to generate an angle deviation signal in dependence thereto, and a control system configured to receive said angle deviation signal to compare said deviation angle to a predetermined maximum deviation angle, and if said deviation angle is less than said maximum deviation angle to set the vehicle in a loading mode for applying a loading procedure, the control system being configured to carry out the loading procedure that includes:

engaging a loading tool of the working equipment with an attachment part at a first end of the load carrying device;

lifting the first end of the load carrying device by said loading tool while a second end of the load carrying device is on ground;

generating a first set of operation instructions for adjusting the position of the vehicle to decrease the deviation angle while the working equipment lifts said first end of the load carrying device;

monitoring the deviation angle during the adjustment of the vehicle position, and comparing the deviation angle to a predetermined loading threshold deviation angle, being less than said maximum deviation angle, generating a second set of operation instructions for the working equipment to move the load carrying device onto the vehicle in response to the deviation angle being less than the threshold deviation angle.

2. The working unit according to claim 1, wherein said at least one sensor member is also configured to measure a proximity parameter related to the distance between said vehicle and said load carrying device, and to generate a proximity signal when said first end of said load carrying device is within a proximity range of a first end of said vehicle, and wherein said control system is configured to receive said proximity signal, and further that receipt of said proximity signal is a presumption for setting said vehicle in said loading mode.

3. The working unit according to claim 1, wherein the operation instructions of said first set of operation instructions are continuously updated during the loading procedure, and that the deviation angle is continuously monitored during the loading procedure.

4. The working unit claim 1, wherein the loading procedure is stopped if deviation angle is equal or larger than maximum deviation angle when the loading tool is attached to the attachment part of the load carrying device.

5. The working unit according to claim 1, wherein said operation instructions are guiding instructions to an operator of the vehicle.

6. The working unit according to claim 1, wherein said at least one sensor member is configured to determine a set of image data depicting the load carrying device, wherein said control system is configured to determine said deviation angle based upon said image data.

7. The working unit according to claim 1, wherein said at least one sensor member is configured to determine a set of image data depicting a front surface of the load carrying device, wherein said control system is configured to determine said deviation angle based upon the angle between said front surface of the load carrying device and a back surface of the vehicle based upon said image data.

8. The working unit according to claim 1, wherein the monitoring of the deviation angle is performed by detecting and analyzing the position of a set of rails arranged on the underside of the load carrying device in a set of image data received from the sensor arrangement.

9. The working unit according to claim 1, wherein said loading tool is a hook, and said working equipment is a hook-lift.

10. The working unit according to claim 1, wherein said operation instructions are control instructions directly applied to control the vehicle.

11. A working equipment configured to load a load carrying device onto a vehicle, said working equipment comprising:

a sensor arrangement comprising at least one sensor member arranged at said working equipment, said at least one sensor member being configured to determine a deviation angle between a longitudinal axis of said vehicle and a longitudinal axis of said load carrying device, and to generate an angle deviation signal in dependence thereto, and a control system configured to receive said angle deviation signal, to compare said deviation angle to a predetermined maximum deviation angle, and if said deviation angle is less than said maximum deviation angle to set the vehicle in a loading mode for applying a loading procedure, the control system being configured to carry out the loading procedure that includes:

engaging a loading tool of the working equipment with an attachment part at a first end of the load carrying device;

lifting the first end of the load carrying device by said loading tool while a second end of the load carrying device is on ground;

generating a first set of operation instructions for adjusting the position of the vehicle to decrease the deviation angle while the working equipment lifts said first end of the load carrying device;

monitoring the deviation angle during the adjustment of the vehicle position, and comparing the deviation angle to a predetermined loading threshold deviation angle, being less than said maximum deviation angle, generating a second set of operation instructions for the working equipment to move the load carrying device on to the vehicle in response to the deviation angle being less than the threshold deviation angle.

12. The working equipment according to claim 11, wherein said at least one sensor members is configured to determine a set of image data depicting a back surface of the vehicle, wherein said control system is configured to determine said deviation angle based upon the angle between said back surface of the vehicle and a front surface of the load carrying device based upon said image data, and wherein said control system is configured to control said vehicle by said first set of operation instructions, via a communication bus.

13. A method in relation to a working unit that comprises a vehicle and a working equipment configured to load a load carrying device on to said vehicle, said method comprising:

determining a deviation angle, between a longitudinal axis of said vehicle and a longitudinal axis of said load carrying device;

generating a deviation angle signal in dependence thereto, and comparing said deviation angle to a predetermined maximum deviation angle, and if said deviation angle is less than said maximum deviation angle setting the vehicle in a loading mode comprising applying a loading procedure, the loading procedure including:

engaging a loading tool of the working equipment with an attachment part at a first end of the load carrying device;

lifting the first end of the load carrying device by said loading tool while a second end of the load carrying device is on ground;

generating a first set of operation instructions for adjusting the position of the vehicle to decrease the deviation angle while the working equipment lifts said first end of the load carrying device;

monitoring the deviation angle during the adjustment of the vehicle position and comparing the deviation angle to a predetermined loading threshold deviation angle, being less than said maximum deviation angle, and generating a second set of operation instructions for the working equipment to move the load carrying device on to the vehicle in response to the deviation angle being less than the threshold deviation angle.

14. The method according to claim 13, comprising measuring, by at least one sensor member, a proximity parameter related to the distance between said vehicle and said load carrying device, and generating a proximity signal when said first end of said load carrying device is within a proximity range of a first end of said vehicle, and receiving said proximity signal, by a control system, wherein receipt of said proximity signal is a presumption for setting said vehicle in said loading mode.

15. The method according to claim 13, comprising determining a set of image data depicting a front surface of the load carrying device, and determining said deviation angle based upon the angle between said front surface of the load carrying device and a back surface of the vehicle based upon said image data.

16. The method according to claim 13, wherein the monitoring of the deviation angle is performed by detecting and analyzing the position of a set of rails arranged on the underside of the load carrying device in a set of image data.

* * * * *